United States Patent [19]
Carpenter et al.

[11] Patent Number: 5,445,051
[45] Date of Patent: Aug. 29, 1995

[54] MEASURE-CUT-STRIP WIRE PROCESSING APPARATUS

[75] Inventors: Thomas S. Carpenter, Manlius; David D. Hand, Cazenovia; David J. Palmowski, Syracuse, all of N.Y.

[73] Assignee: Carpenter Manufacturing Co., Inc., Manlius, N.Y.

[21] Appl. No.: 200,817

[22] Filed: Feb. 23, 1994

[51] Int. Cl.6 .............................................. H02G 1/12
[52] U.S. Cl. ...................................... 81/9.51; 83/947
[58] Field of Search .................. 81/9.51; 83/947, 924, 83/623, 155, 444, 694; 30/90.1, 92

[56] References Cited

U.S. PATENT DOCUMENTS

| | | | |
|---|---|---|---|
| 3,853,156 | 12/1974 | Folkenroth et al. | 81/9.51 |
| 3,942,221 | 3/1976 | Sipusic et al. | 30/90.1 |
| 4,800,791 | 1/1989 | Jügenhake | 83/155 |
| 5,253,555 | 10/1993 | Hoffa | 81/9.51 |

FOREIGN PATENT DOCUMENTS

| | | | |
|---|---|---|---|
| 404261315 | 9/1992 | Japan | 81/9.51 |
| 1166208 | 7/1985 | U.S.S.R. | 81/9.51 |

*Primary Examiner*—Bruce M. Kisliuk
*Assistant Examiner*—Joni B. Danganan
*Attorney, Agent, or Firm*—Charles S. McGuire

[57] ABSTRACT

Apparatus for feeding an insulated electrical wire, or the like, axially with respect to a transverse plane in which a single pair of blade cutting edges are supported for movement toward and away from the axis of the wire. Each blade has a continuous cutting edge forming the periphery of an opening through the blade. The wire is advanced a predetermined distance through the aligned blade openings by a pair of conveyors on opposite sides of the plane of the blade edges. The blades are moved in opposite directions to sever a premeasured length of wire from the supply by first portions of each blade edge. The severed wire portion is then moved by the conveyors to a second axial position and the blades are again moved to cause second portions of the cutting edges to pass partially through the layer of insulation, stopping before contacting the conductor. Axial movement of the wire then causes the engaged blades to sever a slug of insulation and strip it partially or fully from the conductor. The rollers of both conveyors which are nearest the plane of the blade edges are of smaller diameter than the distal rollers, thereby permitting the conveyors to extend and support the wire at positions closer to the blades than otherwise possible.

54 Claims, 16 Drawing Sheets

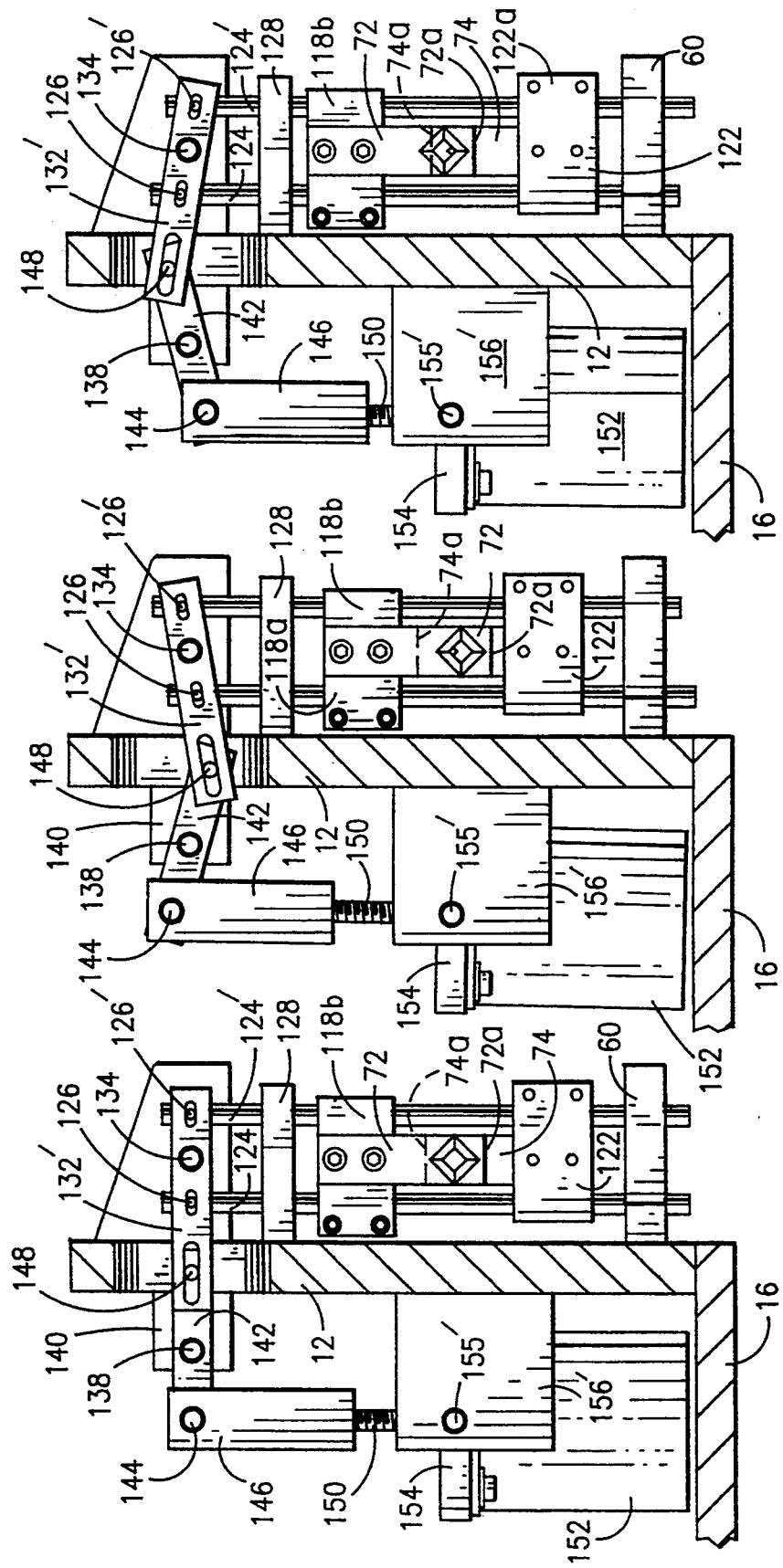

MEASURE-CUT-STRIP WIRE PROCESSING APPARATUS

BACKGROUND OF THE INVENTION

The present invention relates generally to apparatus for cutting successive, measured, longitudinal sections from an elongated filamentary workpiece having a core surrounded by one or more layers of a coating material, cutting at least partially through the coating layer(s) at selected distances from one or both ends of each section to permit severing of a slug of the coating material from the main body thereof and optionally either partly or fully removing the slug(s) of coating material to expose portions of the core. More specifically, the invention relates to novel and improved features of such apparatus, notably including a single pair of blades which serve both to cut entirely through the filamentary member and to cut only through the coating material, as well as features of the apparatus for guiding and moving the workpiece.

Apparatus of the type described in the preceding paragraph is widely used in the electrical and electronics industries to supply high volumes of precut lengths of wire or cable, often with a portion of the insulating or other coating layers removed at one or both ends of each section. As the wire or other elongated member to be processed is fed longitudinally through the apparatus, microprocessor based drive means operate cutter blades to sever the wire into sections of preselected or "measured" lengths, to cut at least partly through the insulation and to sever and strip a slug of insulation from the end of the wire by moving the wire section longitudinally while the blades are engaged with the insulation. Such apparatus has become known in the industry as measure-cut-strip machines. Although such apparatus may be used to process coated optical fiber or other elongated, filamentary materials of uniform cross section having a central core surrounded by one or more layer(s) of covering material(s), for purposes of discussion and illustration herein the workpiece or material to be processed will be considered a simple electrical wire comprised of a conductor coated with a layer of plastic insulation.

Cutting the wire into separate sections, and cutting through the insulation prior to stripping a slug from the conductor, is performed in most of the current measure-cut-strip machines by two or more pairs of blades having opposed cutting edges. For example, the measure-cut-strip machine of related U.S. Pat. Nos. 5,146,673 5,253,555 and 5,265,502 employs three pairs of blades, a center pair for cutting through the entire wire, with additional blade pairs on each side for cutting through and stripping the insulation. Although this adds to the cost and complexity of the machine by requiring separate elements for mounting and moving each set of blades, it has been found that using the same set of blades to cut the wire and to cut and strip the insulation can produce poor results; e.g., the blade edges may become nicked after repeatedly cutting through the wire or cable, causing uneven cutting and/or stripping of the insulation.

One of the objects of the present invention is to provide a measure-cut-strip wire processing machine utilizing only one pair of blades while avoiding problems inherent in cutting the wire with the same cutting edges used to cut and strip the insulation. Another, related object is to provide measure-cut-strip wire processing apparatus having highly accurate, yet simple and relatively inexpensive mechanism for supporting and moving the blades which cut the wire and cut and strip the insulation.

The wire is moved axially in forward and rear directions through the machine of the aforementioned patents by a pair of conveyors, one forwardly and one rearwardly of the three pairs of blades, each comprising a pair of endless belts passing around spaced wheels or rollers and having opposed, elongated stretches for engaging opposite sides of the wire. While such conveyor means are, in general, advantageous for moving the wire axially as it is processed, there are also certain disadvantages. It is a further object of the present invention to provide improvements in conveyor-type wire transporting means in measure-cut-strip wire processing apparatus.

In general, the objects of the invention are to provide novel and improved wire processing apparatus of the measure-cut-strip type having highly efficient and accurate operating features coupled with simple and economical construction requiring a minimal member of parts, and to provide novel and improved blade means for use in such apparatus.

SUMMARY OF THE INVENTION

The measure-cut-strip apparatus of the invention, in a first aspect, includes a single pair of blades each having a single, continuous, cutting edge. The cutting edge of each blade has a first portion and a second portion. The blades are supported with planar surfaces of each in mutual contact in a fixed plane perpendicular to the linear direction of wire movement through the apparatus. Each blade is moveable, with the planar surfaces in sliding, mutual contact in the fixed plane, in a first direction and in a second, opposite direction. The blades are moved by reversible motive means, preferably a linear actuator, through a pivoted linkage which imparts equal movement to the blades, one in the first and the other in the second direction.

In a preferred embodiment, the cutting edge of each blade has four linear sides of equal length forming an enclosed perimeter of a through opening. The blades have a neutral position of relative movement wherein the openings are fully aligned and the perimeters coextensive. The first and second directions of movement of the blades are along a line intersecting the junctures of a first and a second, and of a third and fourth of the four-sided perimeters. The first and second sides of the first blade edge perimeter and the third and fourth sides of the second blade perimeter form the first portions of the cutting edges of the blades; the third and fourth sides of the first blade perimeter and the first and second sides of the second blade perimeter form the second portions. As movement is imparted to the first blade in the first direction and the second blade in the second direction, the first portion of the cutting edges are moved toward one another as the aligned portions of the openings become progressively smaller. When the juncture of the first and second sides of the first blade edge periphery is aligned with the juncture of the third and fourth sides of the second blade periphery, there are no longer any portions of the openings which are aligned. Thus, a wire extending axially through the aligned openings in the neutral position of relative blade movement is severed into two sections by the first portions of the cutting edge of the blades.

Upon movement of the blades in the opposite directions, the openings again become aligned and one of the wire sections may be moved axially through the openings to a desired position where the insulation is to be cut. Continued movement of the blades brings the second portions of the cutting edges toward one another until they extend into the insulation. Blade movement is stopped before the cutting edges engage the conductor, and the wire is moved axially to complete severing of a slug of insulation and to strip the slug fully or partially from the end of the conductor. Repeated sequential movements of the blades and wire in this manner processes the wire in a desired manner, providing wire sections cut to a preselected length with slugs of insulation, also of preselected length, partly or fully stripped from the conductor at one or both ends. Blade movement in both directions is advantageously effected through a pivoted linkage mechanism preferably driven by a linear actuator.

The wire is moved axially through the machine from an inlet to an outlet and by first and second conveyors, each having a pair of belts with spaced, opposed surfaces for gripping the wire and moving it in response to belt rotation. The wire passes between the belts of the first conveyor at the inlet end, through a passageway in a guide member, through the previously mentioned blade openings and between the belts of the second conveyor for ejection at the discharge end. The guide member is mounted for pivotal movement about an axis mutually perpendicular to the directions of wire and blade movement.

Each of the conveyor belts passes around a pair of pulleys in the usual manner. However, contrary to prior practice in machines of this type, the pulleys of each pair nearest the blades are of a diameter smaller than that of the other pulleys, with advantageous results as explained later. Each of the larger diameter pulleys is positively driven, one pulley of each conveyor directly from the output shaft of a respective drive motor and the other by a direct, one-to-one gear drive from the motor output. The smaller diameter rollers of the outlet conveyor are positioned closely adjacent the blades, thus obviating the need for a wire guide between the two. A single adjustment mechanism controls spacing of the opposed portions of the second (outlet) conveyor belts and consequently the pressure applied thereby to a wire section as it is moved through this conveyor. The drive motors of both conveyors are, of course, reversible to permit wire movement in both forward and reverse directions through both conveyors.

The foregoing and other features of construction and operation of the measure-cut-strip wire processing apparatus of the present invention will be more readily understood and fully appreciated from the following detailed description, taken in conjunction with the accompanying drawings wherein:

BRIEF DESCRIPTION OF THE DRAWINGS

FIGS. 16a, 16b and 16d are fragmentary, side elevational views in section on the line 16—16 of FIG. 8 showing various moveable elements in different positions during operation of the apparatus.

DETAILED DESCRIPTION

Figure 1:
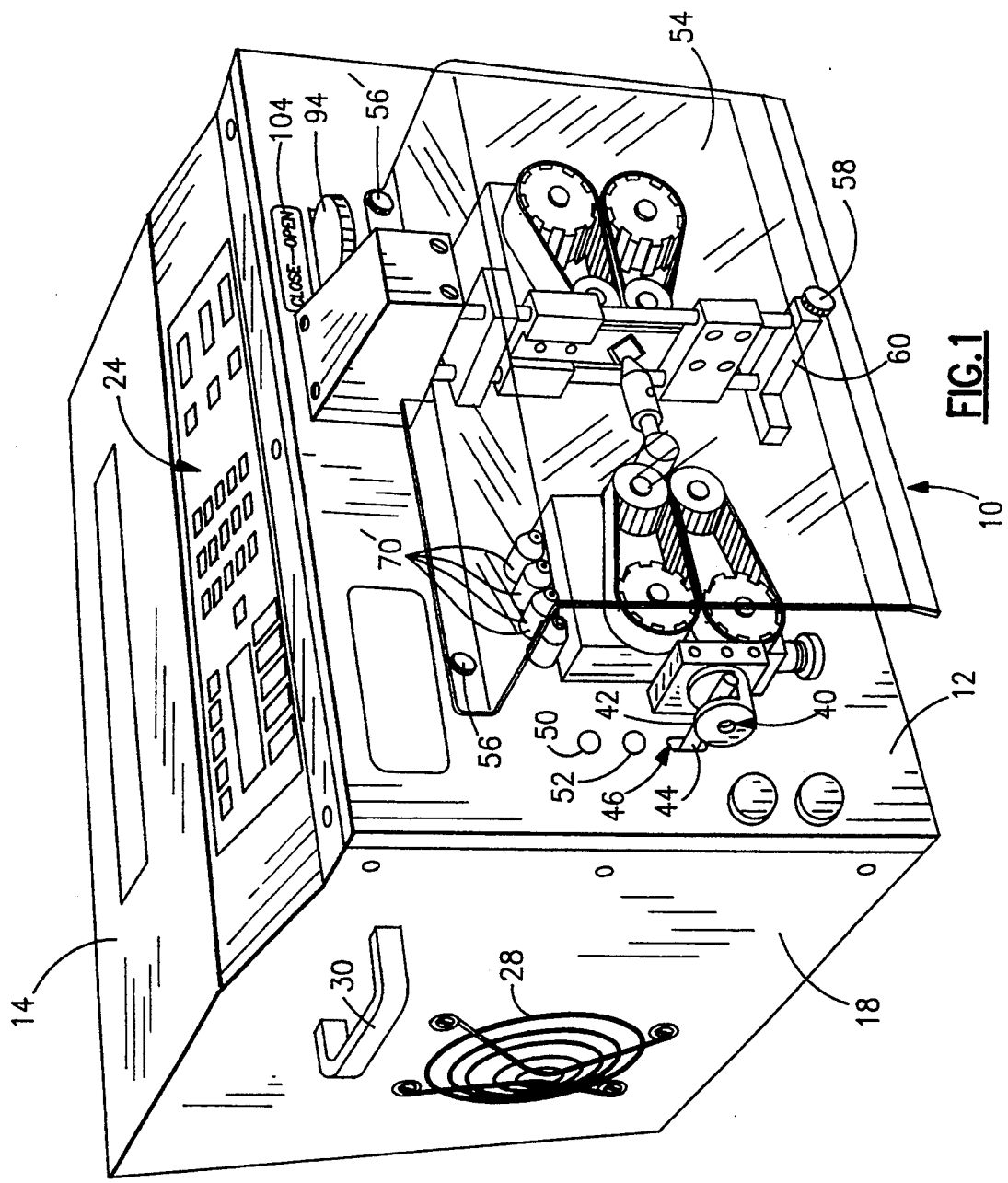
FIG. 1 is a front, left side, top perspective view of a preferred embodiment of the apparatus of the invention.
Figure 2:
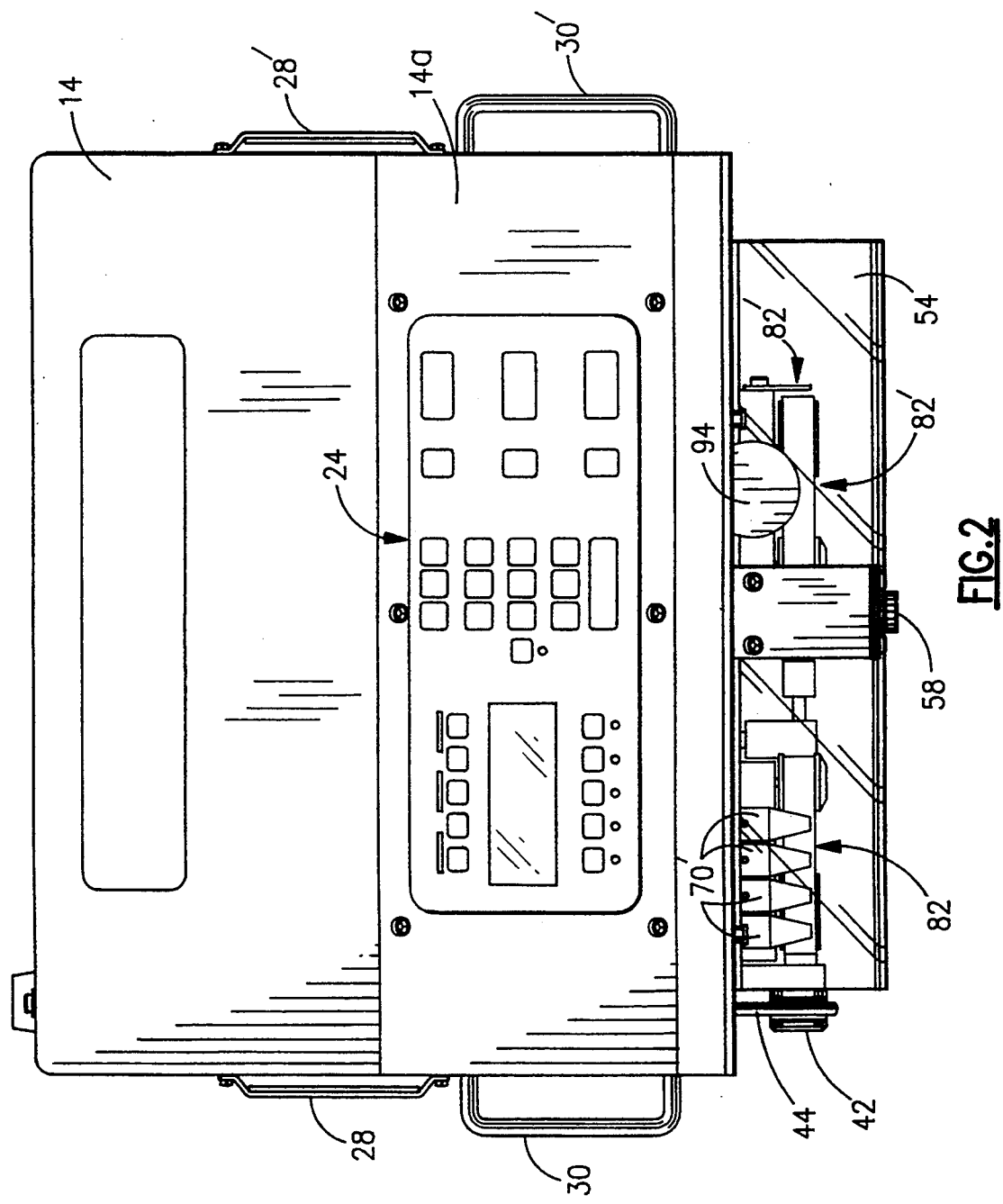
FIG. 2 is a top plan view thereof.
Figure 3:
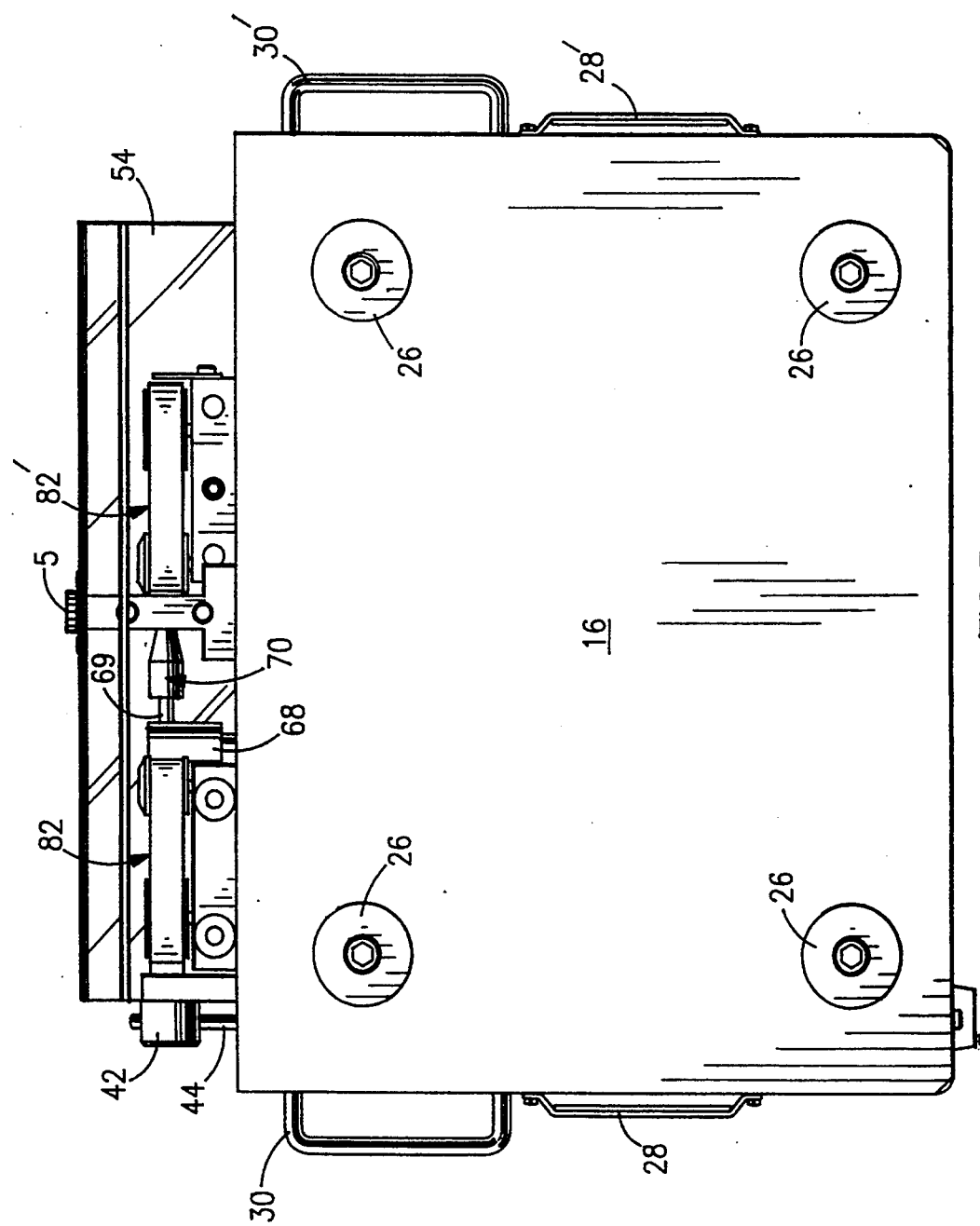
FIG. 3 is a bottom plan view.
Figure 4:
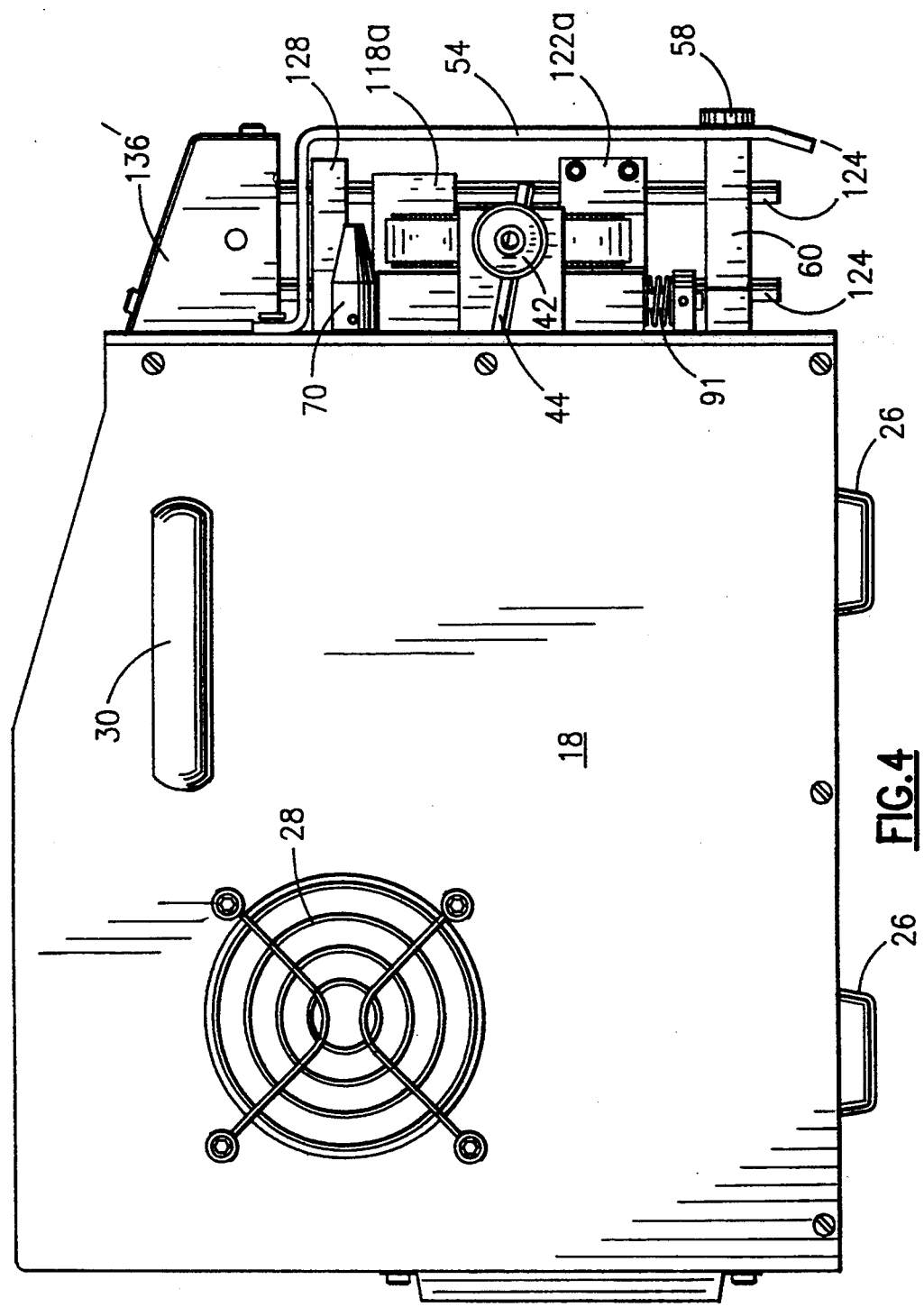
FIGS. 4 and 5 are left and right side elevational views, respectively.
Figure 5:
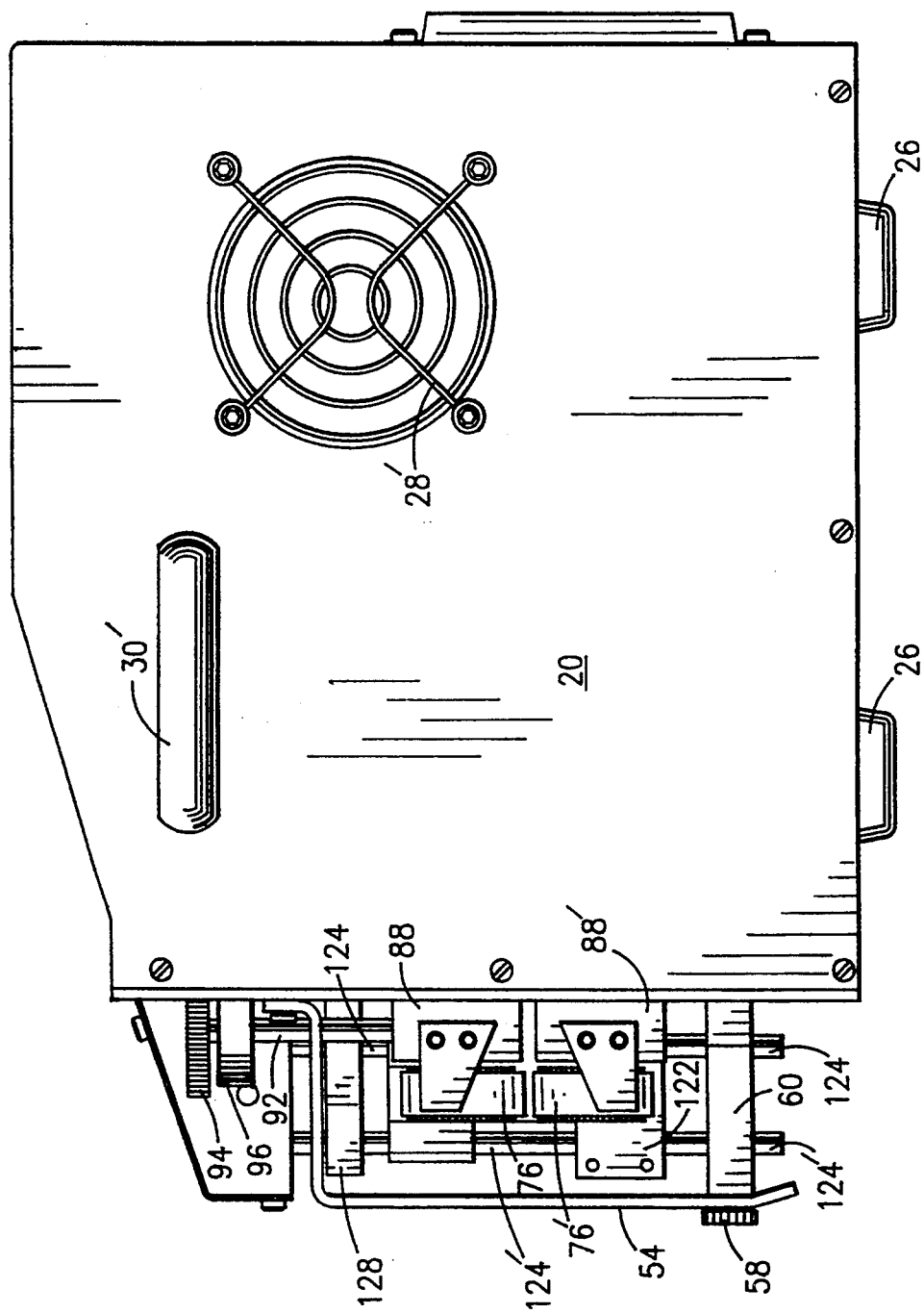
Figure 6:
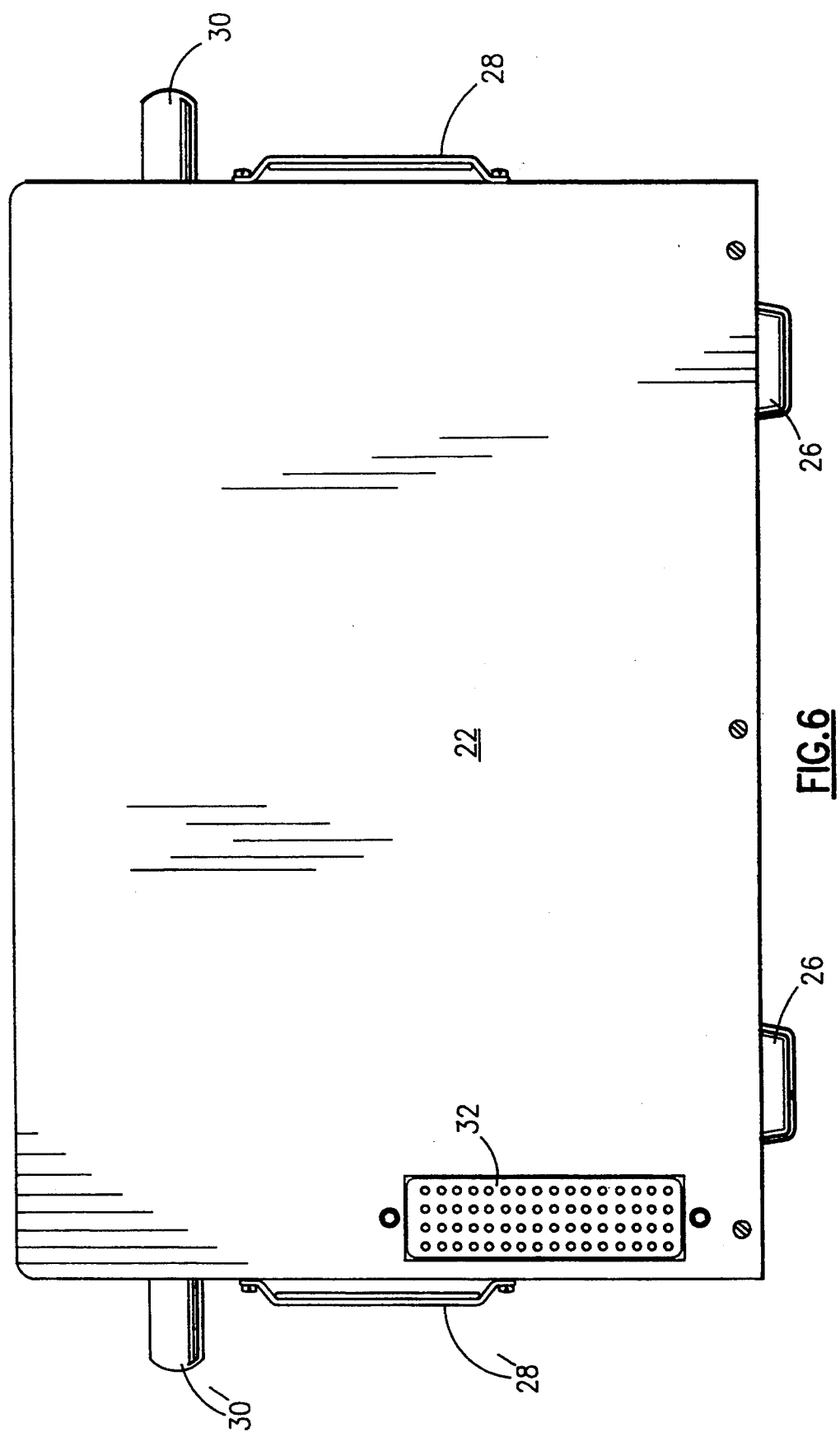
FIG. 6 is a rear elevational view.

The measure-cut-strip wire processing apparatus of the invention is denoted generally by reference numeral 10, and is adapted to receive, as from a coil or other supply, a workpiece in the form of an elongated, filamentary member having a central core surrounded by one or more layers of coating or protective materials. As previously mentioned, for purposes of the present discussion the workpiece will be considered a conventional electrical wire consisting of a conductive core covered by plastic insulation, the core and insulation being referred to collectively as a wire, it being understood that the apparatus is capable of processing other workpieces.

Apparatus 10 includes a housing or cabinet for certain elements to be described later, the housing having the usual, mutually secured walls, namely, front 12, top 14, bottom 16, left side 18, right side 20 and back 22. Operating elements of apparatus 10, are mounted adjacent, and/or extend through front wall 12 from the interior of the housing. An array 24 of control buttons is positioned on forwardly inclined portions 14a of top wall 14. The housing rests upon feet 26 beneath bottom wall 16. Openings, covered by protective grilles 28, 28', are respectively provided in left side wall 18 and right side wall 20. Jack 32 is mounted in rear wall 22 to receive a multi-pin plug for connecting operating power to apparatus 10.

Figure 10:
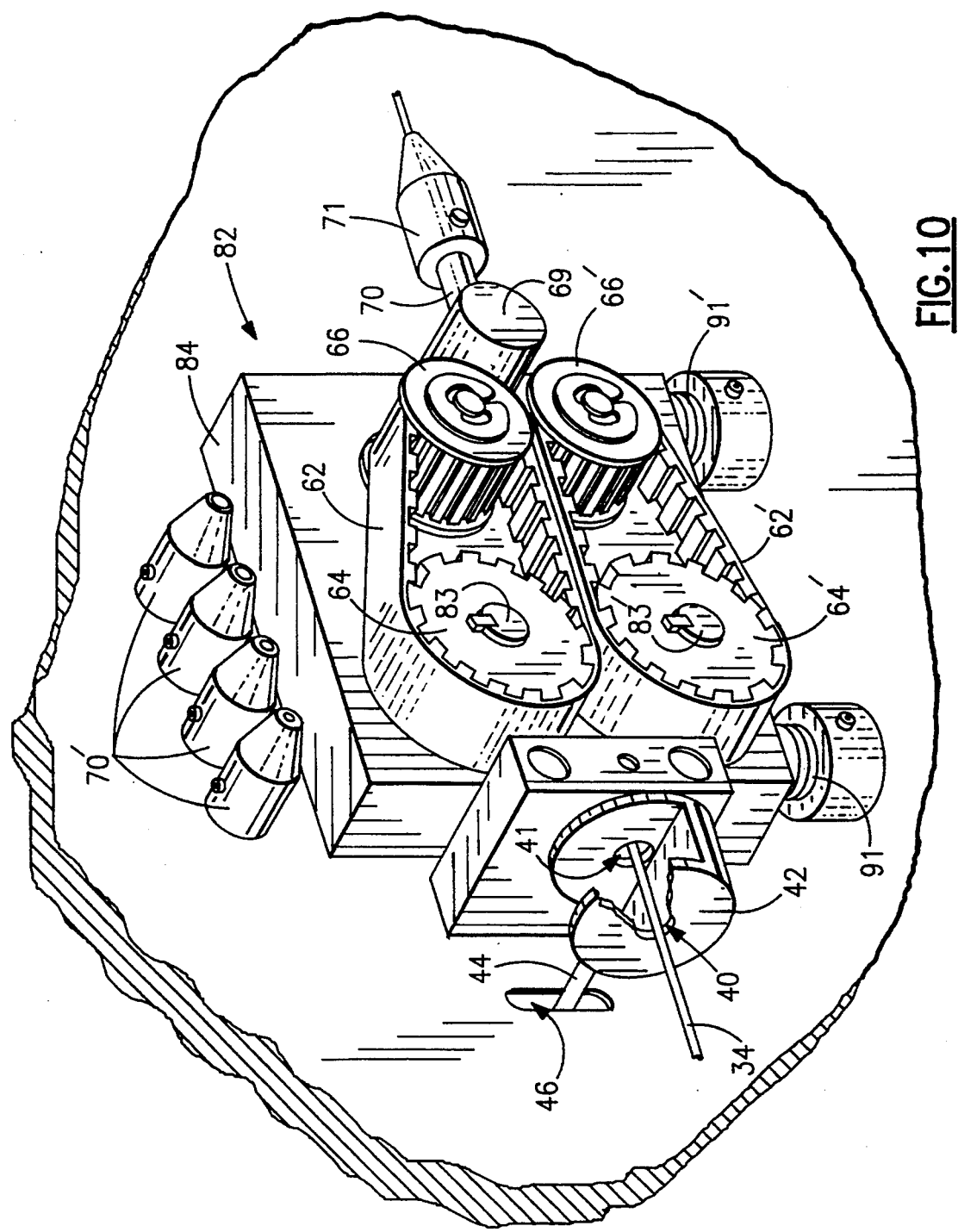
FIGS. 10 and 11 are fragmentary, perspective views of portions of the apparatus.

The workpiece operated upon by apparatus 10 is wire 34, in some views seen as consisting of central core or conductor 36 surrounded by a protective covering in the form of insulation 38. Wire 34 is taken from a coil or reel (not shown) and, preparatory to operation, the leading end of the wire is inserted through openings 40 and 41 (FIGS. 1 and 10) of member 42. Rod 44 extends through vertically elongated opening 46 in housing front wall 12 and is pivotally mounted on support 47 (FIG. 7) within the housing. Rod 44 is freely moveable about its pivotal mounting and, in so moving, actuates switch 48. Rod 44 is manually lifted at its free end and after wire 34 is inserted through the openings in member 42, the rod rests in an upper position upon the wire. When no wire is present, rod 44 drops by gravity to a lower position. Actuation of switch 48 is such that when rod 44 is in its upper position power is supplied to illuminate green LED 50, and when rod 44 is in its lower position red LED 52 is illuminated, thus providing convenient visual notice to an operator of the presence or absence of a workpiece in apparatus 10.

While various motive means, described later, as well as the necessary circuit components for operation of apparatus 10 are mounted within the enclosed space defined by the housing, the processing of wire 34 is performed entirely externally of the housing by elements forwardly adjacent front wall 12. Such elements are covered by their forward side by transparent shield 54 which is releasably secured adjacent its upper edge to front wall 12 by screws 56, 56' and adjacent its lower edge by screw 58 which extends through an opening in shield 54 and into a threaded opening in block 60.

After passing through member 42, wire 34 passes between opposed stretches of a pair of endless bands or belts 62, 62'. Belt 62 passes tautly around relatively large and small diameter pulleys or rollers 64 and 66, respectively, while belt 62' passes around large and small diameter rollers 64' and 66'. Wire 34 is frictionally engaged between the horizontal portions of belts 62 and 62' and advanced axially through apparatus 10 by rotation of rollers 64 and 66, and thus belt 62, in a counterclockwise direction, as viewed from the front side, and rotation of rollers 64', 66' and belt 62' in a clockwise direction As will be seen, the direction of rotation of belts 62 and 62' is reversible to move wire 34 in either forward (toward the right as viewed from the front side) or rearward directions.

Upon exiting belts 62, 62' in the forward direction, wire 34 enters opening 67 in cylindrical member 69 and extends through an axial passageway in a wire guide comprising hollow shaft 70 and tip 71. The passageway has a diameter slightly larger than that of the wire, thereby controlling quite closely the axial path of the wire. A number of additional wire guides, all denoted by reference numeral 70' are conveniently stored on stub shafts (not shown) extending forwardly from front wall 12. Each of guides 70' is essentially identical to guide 70-71, except that the diameter of the internal passageway is different in each guide. Any one of the wire guides may be selectively mounted in the operative position, in a manner described later, to provide the axial passageway conforming most closely to the diameter or gauge of the wire being processed.

Upon exiting guide tip 71, wire 34 passes through aligned openings in blades 72 and 74. The structure and manner of operation of blades 72 and 74 form an important aspect of the present invention and will be explained in detail hereinafter. One of the functions of blades 72 and 74 is to sever wire 34 into successive sections of predetermined length, thereby providing a forward section of wire which is physically separate from the supply fed into apparatus 10.

After passing through the openings in blades 72 and 74, the wire is advanced between opposing stretches of endless belts 76 and 76'. Belt 76 passes tautly around relatively large and small diameter rollers 78 and 80, respectively, and belt 76' likewise passes around rollers 78' and 80'. Wire 34 is frictionally engaged between opposed, horizontal stretches of belts 76 and 76' for axial movement in forward and rearward directions during the processing operation. Upon completion of processing, the individual sections of wire are ejected at the front, right side of apparatus 10.

Belts 62, 62' and their associated rollers and mounting means collectively form what is termed the inlet conveyor, denoted generally by reference numeral 82. Likewise, belts 76, 76' and associated elements form outlet conveyor 82'. Rollers 64 and 64' are mounted upon respective shafts 83, 83' extending through suitable bearings in mounting blocks 84 and 84', and through openings in front wall 12. Rollers 66 and 66' are mounted upon shafts 85 and 85', respectively, which are rotatably affixed to blocks 84 and 84'. Rollers 78, 78' of outlet conveyor 82' are mounted on shafts 87, 87', respectively, which extend through mounting blocks 88, 88' and through front wall 12; rollers 80, 80' are respectively mounted on shafts 89, 89' extending from upper and lower mounting blocks 88, 88'.

Mounting block 84 is fixedly attached to front wall 12 by screws 86, while block 84' is mounted for limited vertical movement with respect to the front wall, and thus with respect to block 84. Springs 91, 91' resiliently urge block 84' upwardly, urging the horizontal stretch of belt 62' toward the opposing stretch of belt 62 in known manner, thus providing tight frictional engagement of the portion of wire 34 passing through inlet conveyor 82.

Figure 12:
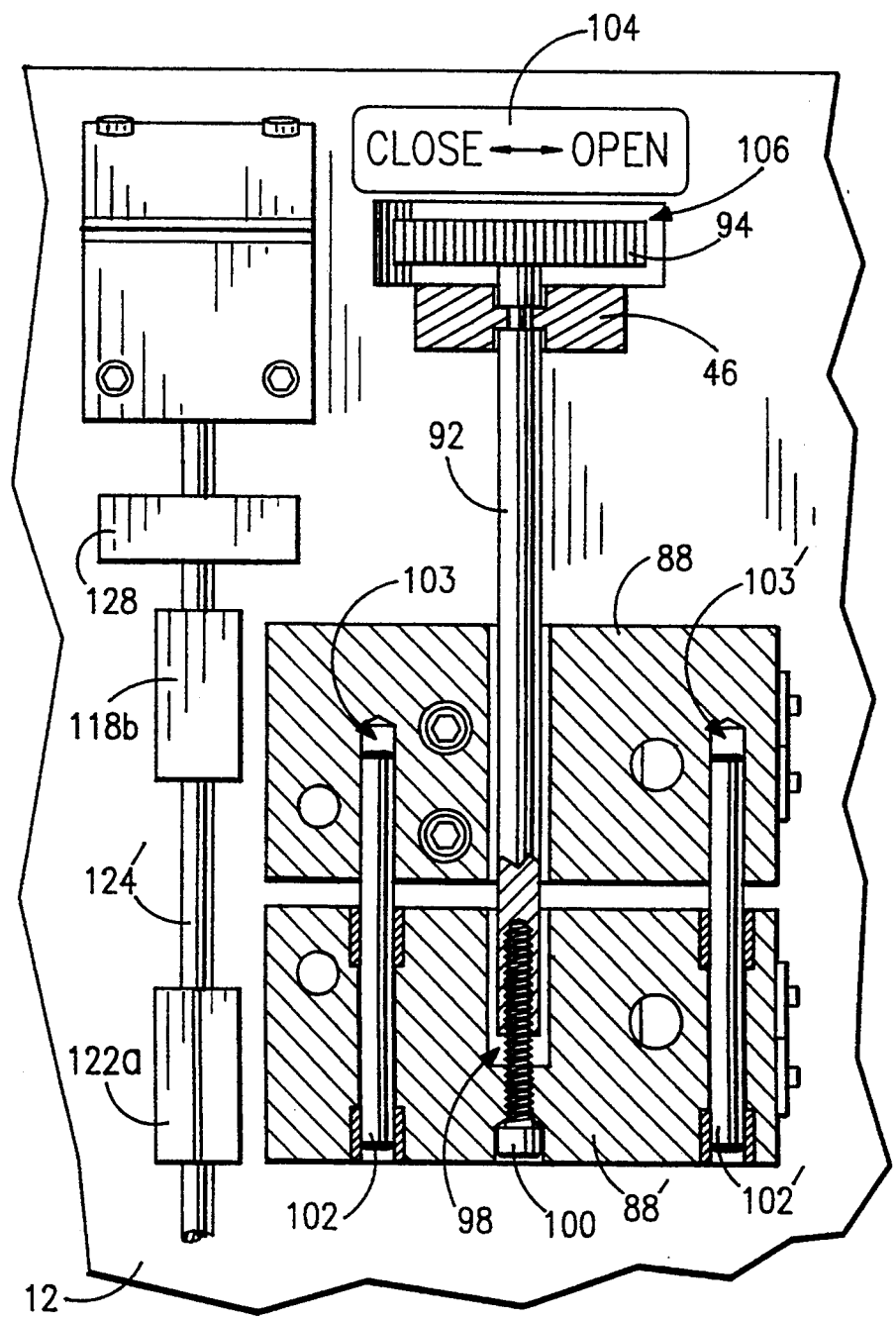
FIG. 12 is a fragmentary, front elevational view, partly in section.

Although the belts of the inlet conveyor are simply urged toward one another, the spacing of opposed, horizontal stretches of belts 76 and 76' is selectively adjustable. Upper mounting block 88 is fixedly attached by screws 90 to front wall 12. As best seen in FIG. 12, shaft 92 extends from thumb wheel 94 at its upper end, loosely through openings in stabilizing block 96 and upper mounting block 88, and terminates within blind openings 98 in lower mounting block 88'. Allen-head screw 100 extends upwardly, into opening 98 and is threadedly received in a tapped, axial opening in the lower end of shaft 92. Guide rods 102, 102' extend fixedly from lower mounting block 88' and are slidingly received in openings 103, 103', respectively, in upper mounting block 88 Thus, by a single, simple adjustment, the spacing of the horizontal, wire-engaging portions of belts 76 and 76' may be closed or opened by rotation of thumb wheel 94 in the respective directions indicated on plate 104. To provide proper relative positioning of the elements, a portion of thumb wheel 94 extends through opening 106 in front wall 12.

Inlet and outlet conveyors 82, 82' are separately powered by electric motors 108, 108' respectively The output shaft of motor 108 is directly coupled to shaft 83 or roller 64. Spur gear 110 on shaft 83 engages identical spur gear 110' on shaft 83' thus providing direct, one-to-one drives of both rollers 64 and 64'. The output shaft of motor 108' is laterally offset, due to space requirements, from the axis of roller shaft 87, and is coupled thereto for one-to-one drive by endless belt 112, passing around a sprocket on the motor drive shaft and an identical sprocket 117 on roller shaft 87. Spur gear 116 on shaft 87 engages identical spur gear 116' on roller shaft 87' thereby providing direct drives to both of outlet conveyor belts 76 and 76'.

Figure 13:
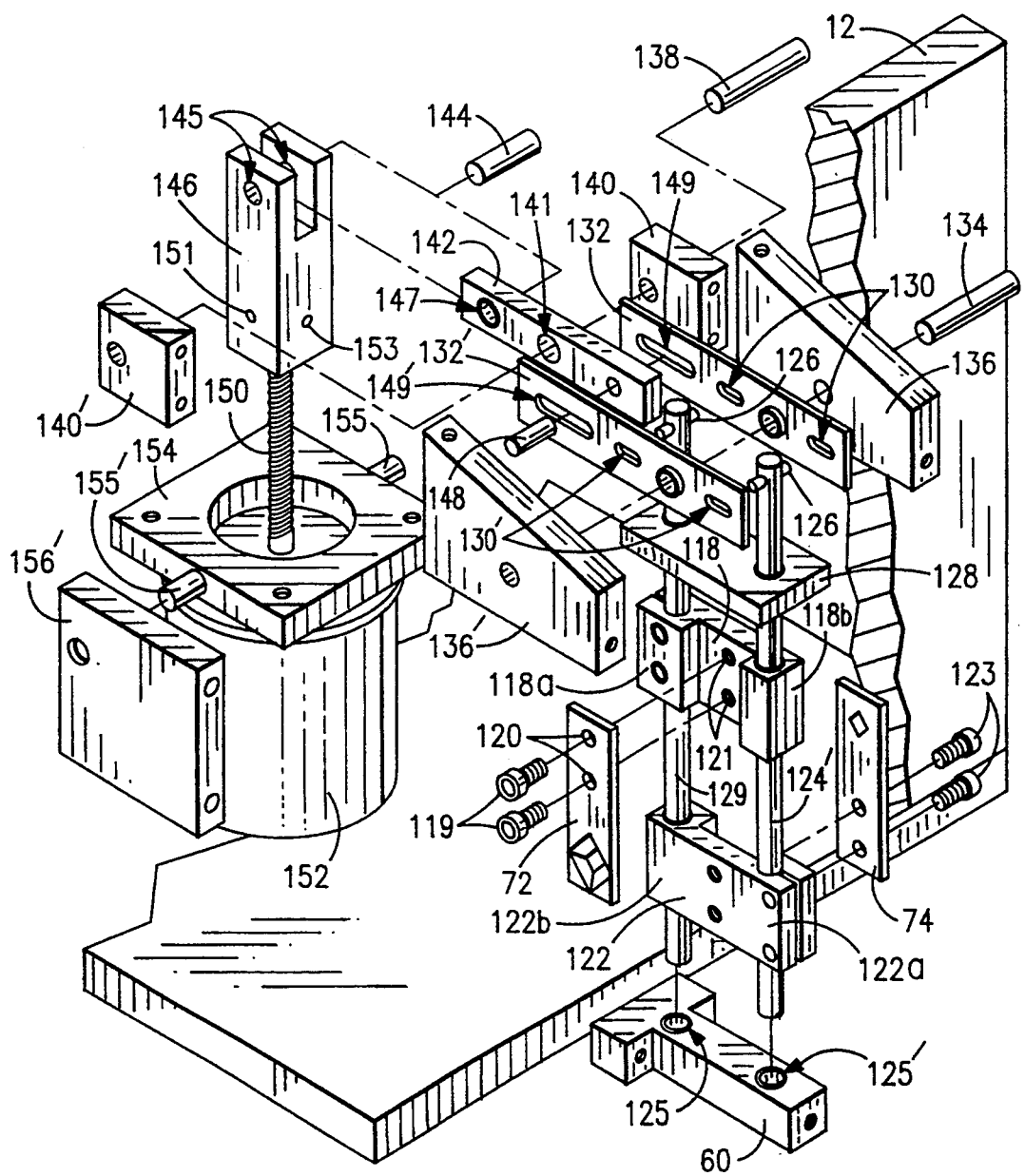
FIG. 13 is a fragmentary, exploded perspective view.
Figure 14:
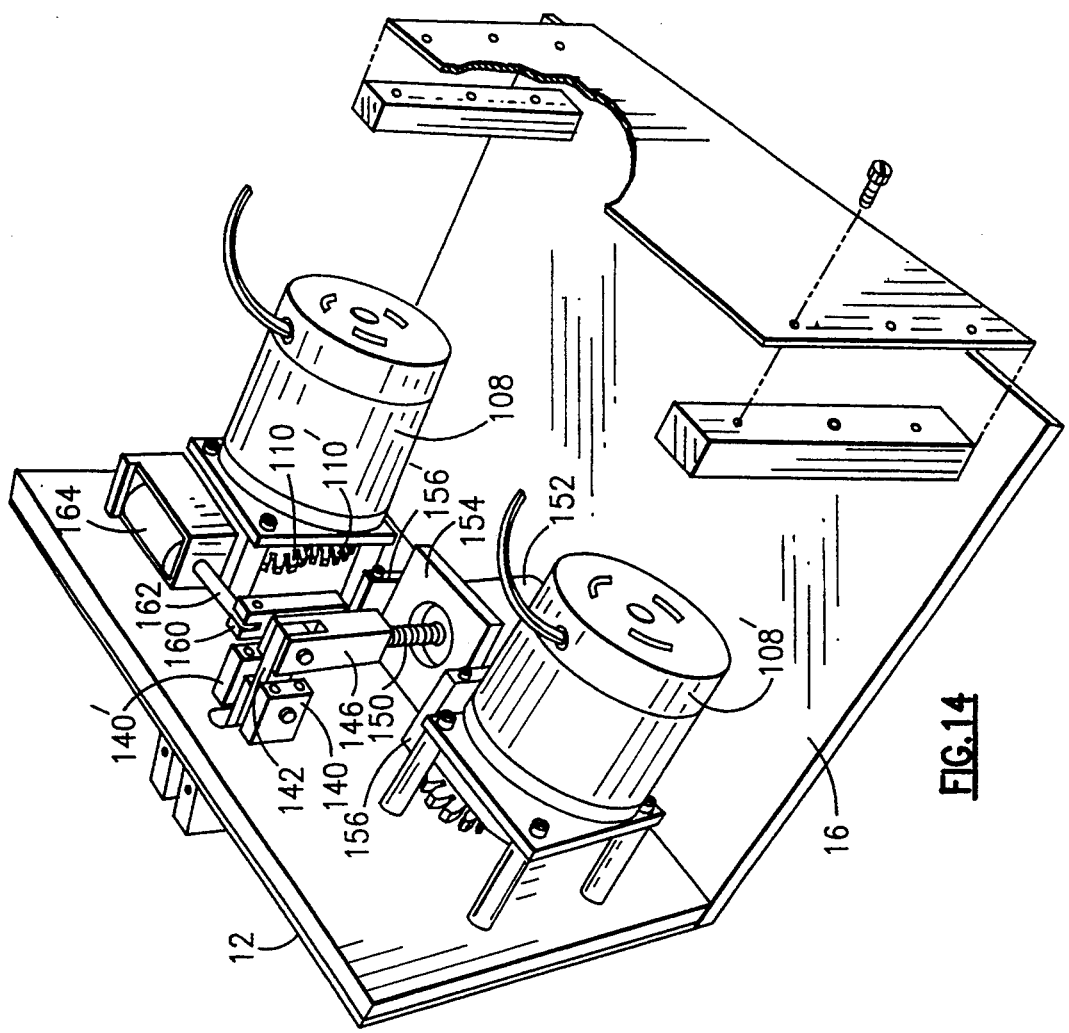
FIG. 14 is a rear, perspective view with portions removed.

Turning now to a detailed consideration of the structure and operation of blades 72 and 74, particular attention is directed to FIGS. 13 and 14. It will first be noted that the two blades are identical to one another and are mounted in back-to-back relation with planar surfaces in mutual engagement in a fixed plane. Blade 72 is fixedly attached to plate 118 by means of screws 119, passing through openings 120 in blade 72 and secured in threaded openings 121 in plate 118. Blade 74 is similarly secured to plate 122 by screws 123. The lower ends of elongated blade operating rods 124, 124' are slidingly received in openings 125, 125', respectively, in previously mentioned block 60 which is affixed to the housing. Pins 126, 126' extend transversely through rods 124, 124;, respectively, adjacent the upper ends thereof.

Rods 124, 124' also extend slidingly through guide openings in fixed plate 128.

One of the ends of each of pins 126, 126' extends loosely through a respective one of elongated slots 130 in link 132; the other ends extend through slots 130' in link 132'. Links 132, 132' are mounted in spaced, parallel relation upon, and for joint pivotal movement about, stub shaft 134 which extends through aligned openings in the links and is mounted on fixed support brackets 136, 136', extending forwardly from front wall 12. Stub shaft 138 extends between mounting brackets 140, 140' attached in spaced relation to the rear side of wall 12, and through opening 141 of link 142; thus, shaft 138 provides a pivotal mounting for link 142 at or near its midpoint.

Pin 144 passes through aligned openings 145 in clevis 146, and through opening 147 adjacent an end of link 142 positioned between the end portions of the clevis. Pin 148 extends outwardly from both sides of link 142 adjacent the end thereof opposite the connection to clevis 146. Opposite ends of pin 148 extend through elongated openings 149, 149' in links 132, 132' respectively. Lead screw 150 extends upwardly from a threaded connection to an internally threaded nut which is rotatably attached to the rotor of linear actuator 152, and through a threaded opening in the lower end of clevis 146 where a pair of set screws 151 and 153 extend into engaging relation with lead screw 150 to insure a secure attachment. Linear actuator 152 is affixed to plate 154. Pins 155, 155' extend outwardly from opposite sides of plate 154 and are rotatably received in respective openings in plates 156, 156', each of which is fixedly secured to the rear side of wall 12.

As linear actuator 152 is powered to produce a rotational output, lead screw 150 is vertically adjusted in either an upward or downward direction. This, of course, produces upward or downward movement of clevis 146 and the end of link 142 pivotally attached thereto due to the secure attachment between lead screw 150 and clevis 146. As link 142 pivots about pin 138, equal pivotal movement is imparted to links 132 and 132' about pin 134. This in turn imparts equal and opposite vertical movement to blade operating rods 124 and 124' by virtue of pins 126 and 126' passing through elongated slots 130 and 130' on opposite sides of the pivotal mounting (on pin 134) of links 132 and 132'.

Plate 118 is fixedly secured at side 118a thereof to rod 124, rod 124' passes slidingly through an opening in side 118b of plate 118. Plate 122 is fixedly secured at side 122a to rod 124' and rod 124 passes slidingly through an opening in side 122b. Thus, as links 132, 132' are pivoted in one direction, rod 124 (and consequently plate 118 and blade 72) is moved upwardly, while rod 124' (and plate 122 and blade 72) is moved downwardly. Opposite movement of blades 72 and 74 is produced by reversing the direction of rotation of linear actuator 152, thereby rotating links 132, 132' in the opposite direction.

From the foregoing description it will be understood how equal and opposite, linear movement in a vertical direction (in the illustrated orientation) is imparted to blades 72 and 74. The distance of blade movement is precisely defined through controlled actuation of linear actuator 152, providing much greater precision than conventional blade drive means such as electric motors. Furthermore, precisely controlled blade movement is achieved with a minimal number of parts connecting the single motive means with the single pair of blades. Accommodation of translations between linear and pivotal relative movement of various parts is provided by the elongated nature of slots or openings 130, 130', 149 and 149' in links 132, 132', as well as by the pivotal mounting on pins 155, 155' of linear actuator 152.

Figure 15A:
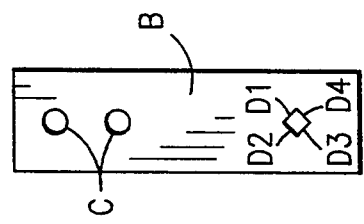
FIGS. 15a–c are front, rear and sectional views of a preferred embodiment of a blade.
Figure 15B:
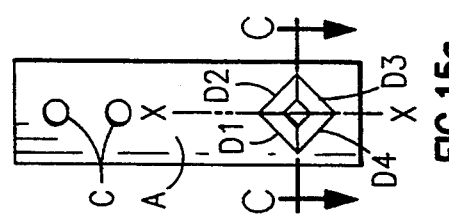

A preferred form of the two identical blades used in apparatus 10 is shown from what are termed its front and rear sides in FIGS. 15a and 15b, respectively, although it will be understood that other configurations having the required physical characteristics are also suitable. The blade of FIGS. 15a–c has front and rear surfaces A and B, respectively, and through openings C for passage of blade mounting screws. An additional, through opening is defined by a continuous perimeter of four sides D1, D2, D3, and D4, of equal length. The perimeter of this opening is surrounded on one side by planar surfaces angularly-arranged with respect to parallel, planar front and rear surfaces A and B and extending from front surface A to the perimeter of the opening at rear surface B, thus providing a sharp cutting edge about the perimeter of this opening in the plane of surface B.

An axis through the juncture of sides D1 and D2 and the juncture of sides D3 and D4 is indicated at X—X in FIG. 15a. The point at the juncture of sides D1 and D4 is indicated at E1 in the sectional view of FIG. 15c, and the juncture of sides D2 and D3 is indicated at E2. When two such identical blades are placed in superposed relation with at least portions of their rear surfaces B in mutual contact, they may be relatively arranged so that the perimeters of the four sided openings are fully aligned, i.e., are coextensive. In fact, the two blades may be so arranged whether screw openings C of each blade are positioned at the same or at opposite ends of the superposed blades.

Figure 15C:
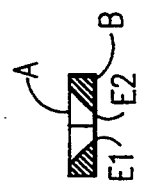

Considering a pair of blades having the structure of the blade shown in FIGS. 15a–c in the context of apparatus 10, attention is now directed to FIGS. 16a–c. Blade 72 is mounted to extend downwardly from plate 118, and blade 74 extends upwardly from plate 122. The ends of blades 72 and 74 opposite the ends at which they are attached to the plates are indicated at 72a and 72a, respectively, end 74a, of course, being hidden by blade 72 and indicated in dotted lines.

The elements are shown in FIG. 16a in what is termed the neutral position with the perimeters of the four-sided openings i.e., the cutting edges, fully aligned and coextensive. In FIG. 16b, linear actuator 152 has vertically adjustable lead screw 150 to move clevis 146 upwardly, thereby pivoting links 142, 132, and 132' to cause rod 124 and blade 72 to move downwardly, and rod 124' and blade 74 to move upwardly. This, of course, moves the juncture of the two upper sides of the cutting edge of blade 72 and the juncture of the two lower sides of the cutting edge of blade 74 toward one another. That is, the blades are moved relative to one another in opposite directions, along axis X—X of FIG. 15a, to decrease the area of the aligned portions of the through openings. A wire extending through the initially aligned openings will be engaged by first portions (two sides of each) of the cutting edge of each blade, and will be fully severed if relative movement of the blades continues until no portions of the through openings are aligned.

FIG. 16c illustrates the relative positions of the elements when moved from the neutral position in the direction opposite to that of FIG. 16b. Lead screw 150 has been vertically adjusted by linear actuator 152 to move clevis 146 downwardly, thereby pivoting link 142 and links 132, 132' to cause upward movement of rod 124 and downward movement of rod 124'. Thus blades 72 and 74 are moved upwardly and downwardly, respectively, to move the juncture of the two lower sides of the cutting edge of blade 72 and the juncture of the two upper sides of the cutting edge of blade 74 toward one another. The area of the aligned portions of the openings surrounded by the cutting edges of the two blades progressively decreases, as in movement from FIG. 16a to FIG. 16b, but in the opposite direction.

A wire extending through the aligned portions of the blade openings will be engaged by what may be termed a second portion of each cutting edge when the area of the aligned portions of the openings is sufficiently reduced. In one aspect of operation of apparatus 10, as will be explained, movement of blades 72 and 74 toward the FIG. 16c position is stopped after the second portion of each cutting edge has passed through insulation 38 but before the edges contact conductor 36. By moving the wire axially in the proper direction, through actuation of one of conveyors 82 and 82', while the blades remain engaged with the insulation, a slug of insulation will be severed and removed from an end portion of the wire.

FIG. 17 illustrates a typical operational sequence of apparatus 10. In insets b and d blades 72 and 74 are shown in their neutral position, the blade openings surrounded by the cutting edges being fully aligned and coextensive in the fixed plane of the mutually contacting surfaces of the blades. Initially, with the blades in the neutral position, wire 34 is axially advanced through the inlet conveyor, through the passageway defined by the wire guide (including illustrated portions 69 and 70), through the aligned openings in the blades and partially through the outlet conveyor. With the wire in the position of FIG. 17a, the conveyors are stopped and linear actuator 152 is operated to move the linkages and blades to the FIG. 17a position, (also shown in FIG. 16b) with no portions of the blade openings aligned, thereby severing the wire and forming a new leading end at the plane of the cutting edges. The outlet conveyor is then operated in the direction of the arrows on rollers 80, 80' in FIG. 17a until the short, scrap section 34b is ejected at the right side. Apparatus 10 is now initialized and ready to begin forming and processing sections of wire of predetermined length with portions of insulation, also of predetermined length, established by operator inputs to the memory of the microprocessor through control keys of array 24, stripped partly or fully from one or both ends of the wire sections.

Figure 17A:
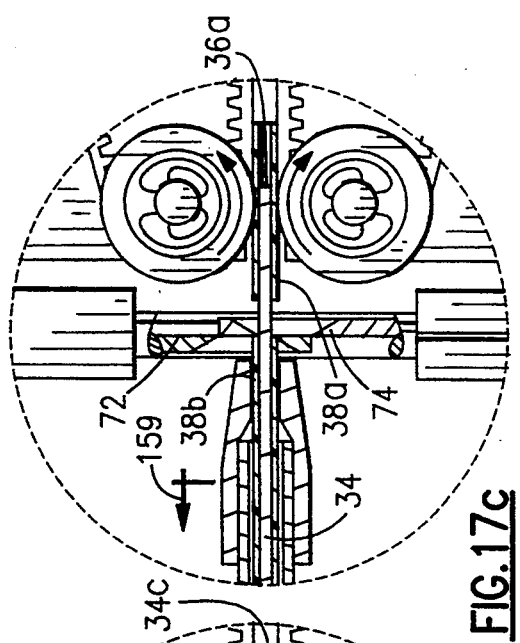
FIG. 17 As a series (a through f) of enlarged, fragmentary, front elevational views illustrating an operational sequence of portions of the apparatus.
Figure 17B:
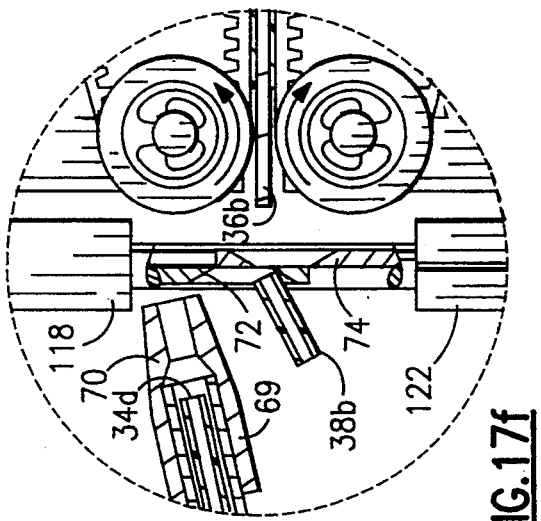

Blades 72 and 74 are moved to the neutral position and wire 34 is axially advanced by operation of both conveyors until the new leading end 34c is spaced from the plane of the cutting edges by a distance equal to the length of a slug of insulation to be severed and partly or fully stripped from an end portion of the conductor. Operation of both conveyors is then stopped and the position of the elements is as shown in FIG. 17b.

Figure 17C:
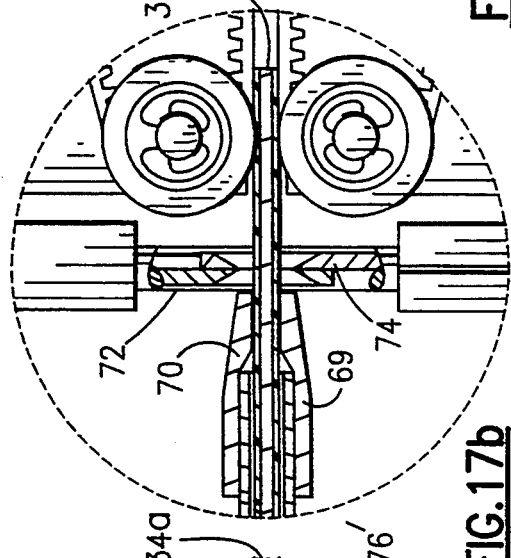

Linear actuator 152 is then operated to move the blades to the position of FIG. 17c, which is also the position previously described with relation to FIG. 16c. That is, second portions of the cutting edge of each blade pass through the layer of insulation but do not contact the conductor. Inlet conveyor 82 is then actuated to move the wire in the reverse or rearward direction, indicated by arrow 159. Since the blades remain engaged with the insulation, rearward movement of the wire severs the insulation at the plane of the cutting edges, forming slug 38a. In the position shown in FIG. 17c, rearward movement of wire 34 has retracted leading end 36a of the conductor some distance into slug 38a, and leading end 38b of the severed insulation the same distance rearwardly of the plane of the cutting edges. Movement may continue until the end of the conductor is fully withdrawn from slug 38a or, if desired, only partially withdrawn with the severed slug remaining on the end of the wire, as is common in measure-cut-strip and other types of wire processing apparatus.

If slug 38a is to be fully removed, wire 34 is moved rearwardly until conductor end 36a is at the plane of the cutting edges, whereupon outlet conveyor 82' may be operated in the direction of the arrows on the rollers in FIG. 17c to eject slug 38a from the outlet end. In any case, after severing and the desired amount of stripping of slug 38a, blades 72 and 74 are moved back to the neutral position and both conveyors are operated to advance the wire until leading end 36a of the conductor is spaced from the plane of the cutting edges by a distance equal to the predetermined length of the wire sections. The blades are then moved again to the FIG. 17a position to sever the wire to provide a forward section of desired length, physically separated from the incoming wire supply, with a severed slug of insulation partly or fully stripped from the leading end of the conductor.

Figure 17D:
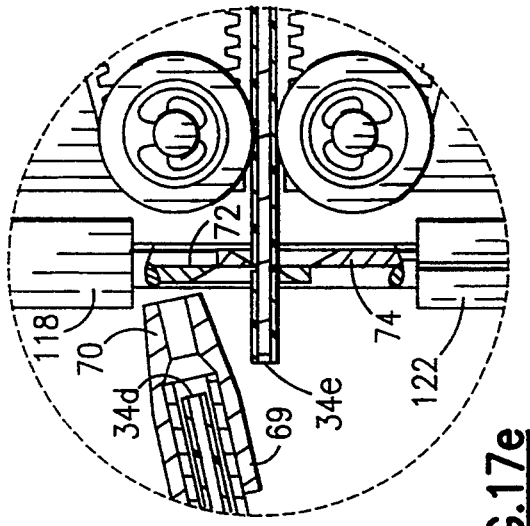

If a slug of insulation is to be severed and stripped from the trailing end of the separate section of wire, as is typically the case, the elements are next moved to the position of FIG. 17d. That is, blades 72 and 74 are moved back to the neutral position, inlet conveyor 82 is reverse-actuated to withdraw the newly formed leading end 34d of the wire supply a short distance (e.g., $\frac{1}{4}$") into the wire guide, and the latter is pivotally moved about the axis of cylindrical portion 68 in a manner which will now be described.

Figure 7:
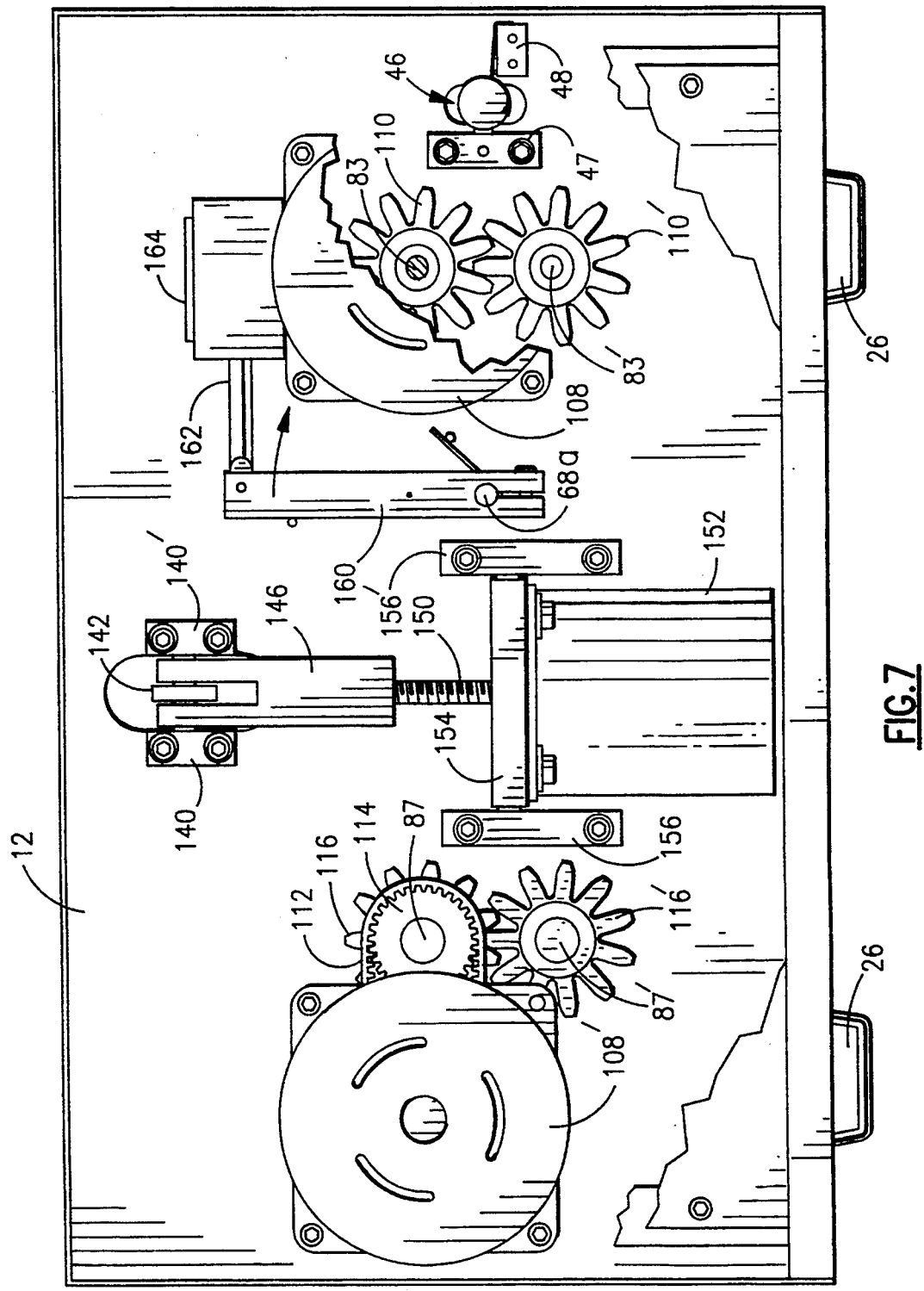
FIG. 7 is a rear elevational view with certain portions removed.
Figure 8:
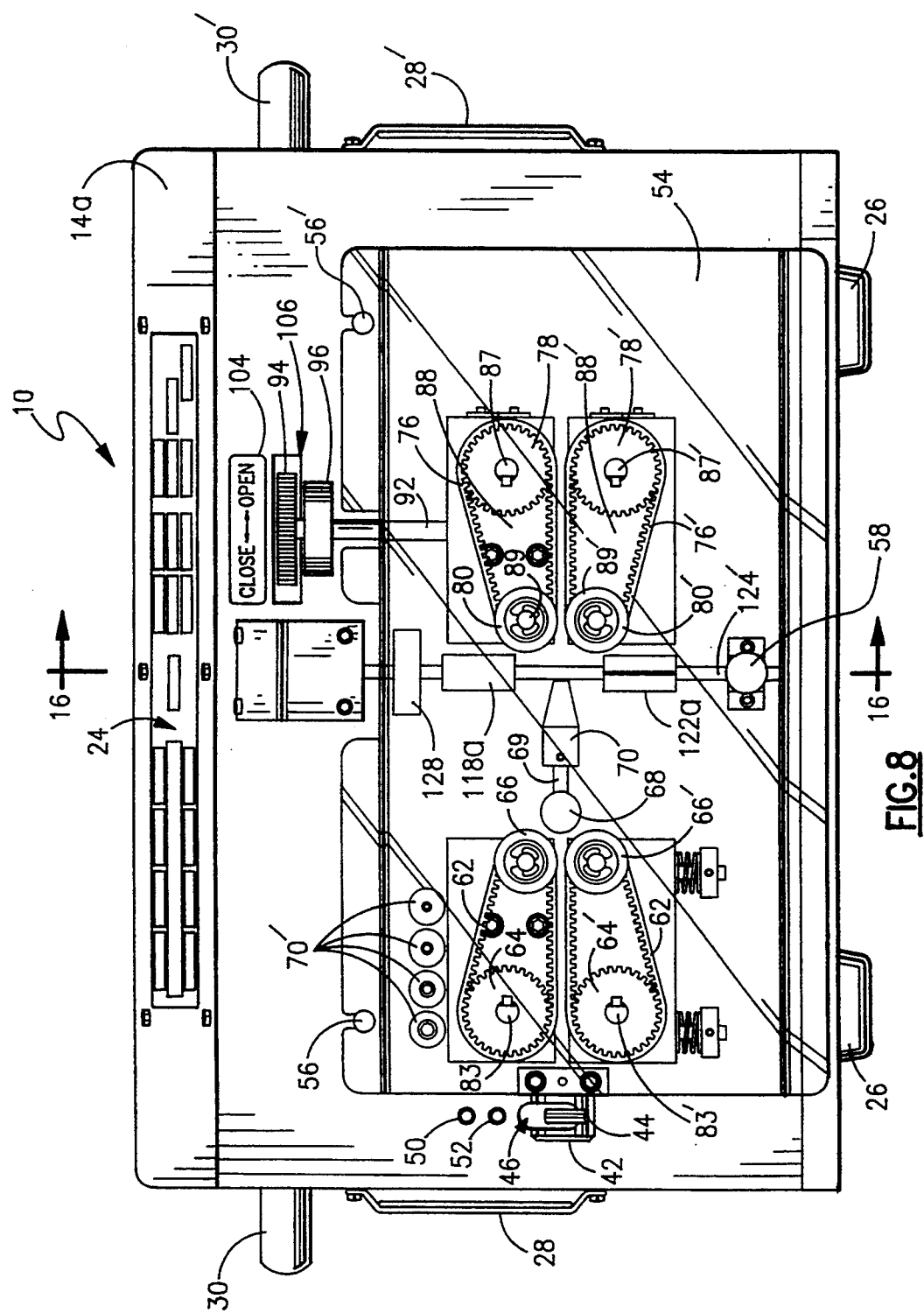
FIG. 8 is a front elevational view.
Figure 9:
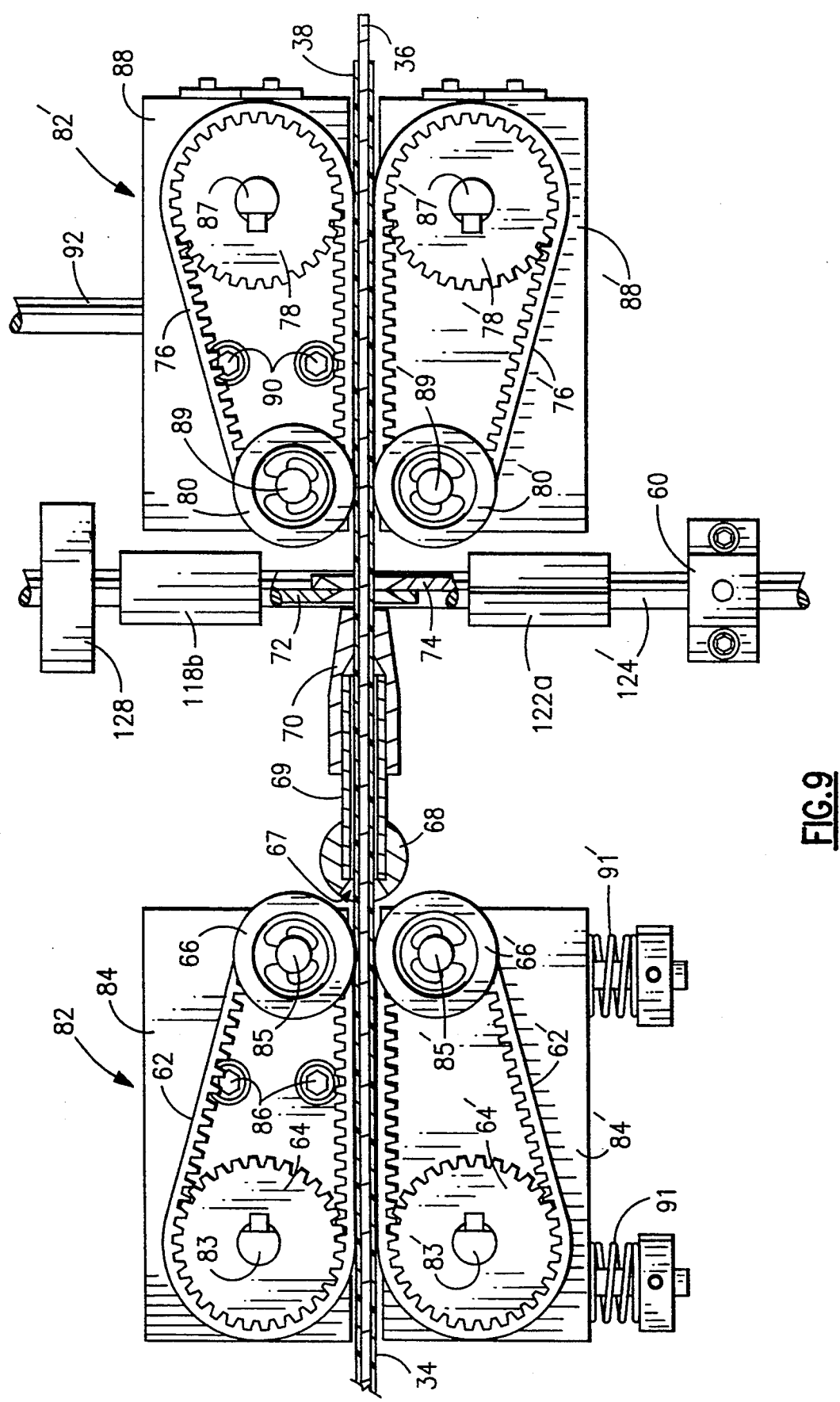
FIG. 9 is a fragmentary, front elevational view with portions in section.
Figure 11:
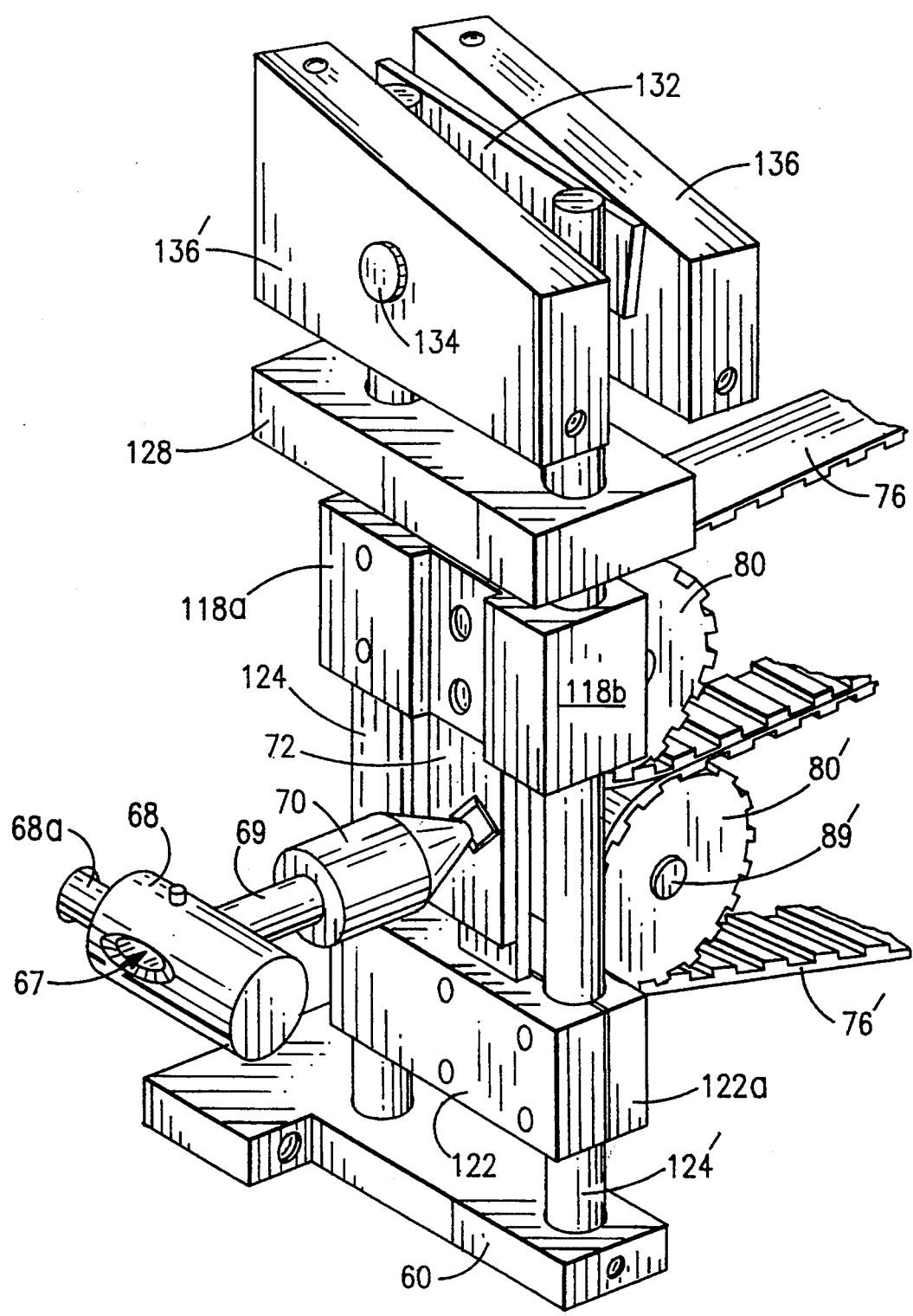
Figure 17E:
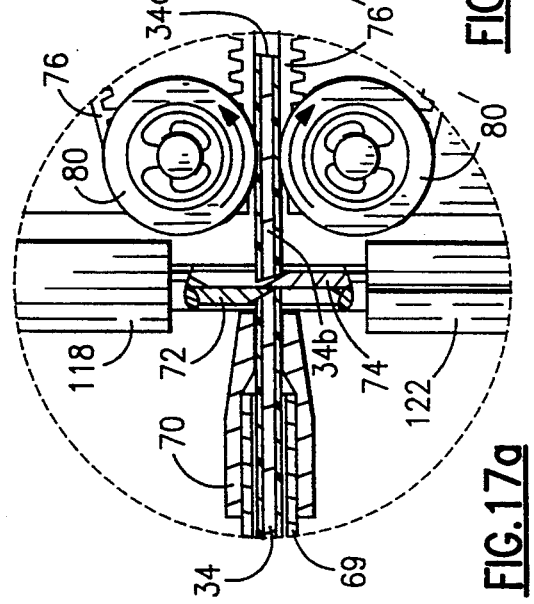
Figure 17F:
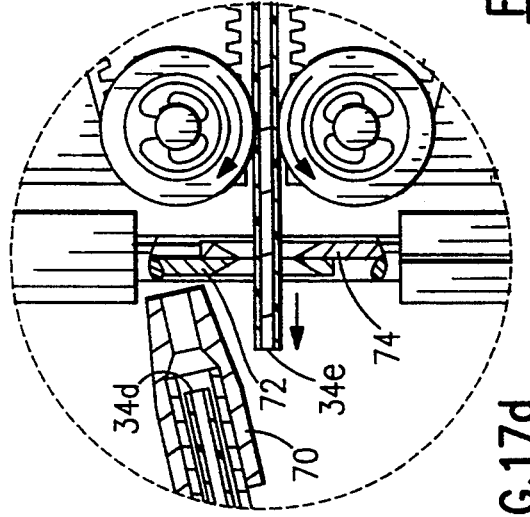

As seen in FIG. 11, reduced diameter portion 68a extends rearwardly from cylindrical portion 68 of the wire guide. Portion 68a extends through front wall 12, and is engaged rearwardly thereof by arm 160, as seen in FIG. 7. Arm 160 is attached adjacent its upper end to operating rod 162 of solenoid 164 (see also FIG. 14). Actuation of solenoid 164 to move rod 162 to the right, as viewed in FIG. 7, rotates arm 160 in the direction of the curved arrow about the axis of portion 68a. Rotation of arm 160 rotates the wire guide to raise the free end thereof above the axis of wire travel through the conveyors, as shown in FIGS. 17d-f.

With the wire guide in its upper position, trailing end 34e of the forward section of wire may be moved rearwardly by reverse actuation of outlet conveyor 82'. The forward section is so moved until end 34 is spaced from the plane of the cutting edges by a distance equal to the predetermined length of the slug of insulation to be severed at the trailing end. Such movement is indicated by the arrows in FIG. 17d. Blades 72 and 74 are then moved to the position of FIG. 17e (the same as in FIGS. 16c and 17c) to pass through and engage the insulation without contacting the conductor. Forward actuation of the outlet conveyor, as indicated by the arrows in FIG. 17f, advances the forward section of wire, stripping slug 38b from the now bare end portion 36b of the conductor, and ejecting the fully processed wire section at the outlet end. As earlier mentioned, it may be desirous to only partially strip slug 38b from the end of wire 34 instead of fully stripping slug 38b.

It should be noted that the angled or beveled surfaces which surround the cutting edge on one side of each blade provide convenient guides for the wire as it is moved in either the forward or rearward direction through the aligned openings in the blades. Also, utilizing rollers of relatively small diameter at one end of each of the inlet and outlet conveyors permits the ends of the conveyors to be positioned closer to the wire guide and the blades; this is advantageous since the unsupported portions of the wire are shorter and the wire is therefore more easily maintained on the desired axis. The wire is accurately guided to the plane of the blade cutting edges by conveniently interchangeable guide tips having a passageway closely approximating the diameter of the wire being processed.

What is claimed is:

1. In processing apparatus for an elongated, filamentary member having a core surrounded by a coating material, said apparatus including means for moving said filamentary member in a longitudinal direction relative to a fixed plane perpendicular to said direction as said member is cut into separate, longitudinal sections and said coating material is at least partially severed at preselected longitudinal positions, the improvement comprising:
    a) a first blade member having a first, planar surface positioned in said fixed plane, and a first, continuous, peripheral edge also positioned in said fixed plane and fully surrounding a first, through opening in said first blade member;
    b) a second blade member having a second, planar surface positioned in said fixed plane, and a second, continuous, peripheral edge also positioned in said fixed plane and fully surrounding a second, through opening in said second blade member;
    c) support means holding said first and second blade members in relative positions wherein at least portions of said first and second openings are aligned to permit passage therethrough of said filamentary member in said longitudinal direction; and
    d) motive means operatively connected to said support means to impart reciprocal, relative movement to said blade members in first and second, opposite directions with said first and second, planar surfaces in sliding contact with one another in said fixed plane, movement in said first direction serving to move respective first portions of said first and second peripheral edges toward one another while moving respective second portions of said first and second peripheral edges away from one another, movement in said second direction serving to move said second portions of said peripheral edges toward one another while moving said first portion away from one another.

2. The invention according to claim 1 wherein said first and second through openings are of the same size and configuration.

3. The invention according to claim 2 wherein said configuration is comprised of four, equal-length sides, said first and second blade members having a neutral relative position from which movement in said opposite directions is effected, the four sides of said first and second openings being coextensive in said neutral position.

4. The invention according to claim 3 wherein said first and second, opposite directions are linear along a line through the junctures of a first and second of said four sides of each of said openings and through the junctures of a third and a fourth of said four sides.

5. The invention according to claim 4 wherein said first and second sides of said first opening and said third and fourth sides of said second opening form said first portions of said first and second peripheral edges, and said third and fourth edges of said first openings and said first and second edges of said second opening form said second portions of said peripheral edges.

6. The invention according to claim 1 wherein said motive means comprises a linear actuator.

7. The invention according to claim 1 wherein said motive means is electrically powered and comprises an output drive member and a linkage connecting said drive member to said support means.

8. A physically supported pair of blades for cooperative use in apparatus for processing an elongated, filamentary workpiece, said blades comprising:
    a) a first blade having a first, planar surface and a first cutting edge in the plane of said first surface, said first cutting edge defining at least a portion of a periphery fully surrounding a first, through opening in said first blade;
    b) a second blade having a second, planar surface and a second cutting edge in the plane of said second surface, said second cutting edge defining at least a portion of a periphery fully surrounding a second, through opening in said second blade;
    c) means for supporting said first and second blades with said first and second planar surface in mutual contact, whereby said first and second cutting edges lie in parallel planes, and with at least portions of said first and second openings aligned for passage of said workpiece through said aligned portions along an axis substantially perpendicular to said common plane; and
    d) motive means for imparting movement to at least one of said blades relative to the other in a direction parallel to said common plane to move said first and second openings toward and away from relative alignment, said motive means imparting reciprocal movement to said at least one blade to move said first and second openings toward and away from relative alignment in each of two, opposite directions, whereby first portions of each of said first and second cutting edges are moved toward one another during relative blade movement away from full alignment of said first and second openings in a first direction, and second portions of each of said first and second cutting edges are moved toward one another during relative blade movement away from full alignment of said first and second openings in a second direction, whereby a workpiece extending through said openings will be engaged by said first portions of said cutting edges upon relative blade movement in said first direction, and by said second portions upon relative blade movement in said second direction.

9. The invention according to claim 8 wherein said motive means imparts movement to both of said blades in directions parallel to said common plane.

10. The invention according to claim 9 wherein said blades are moved in opposite directions.

11. The invention according to claim 10 wherein said motive means imparts reciprocal, linear movement to both of said blades.

12. The invention according to claim 11 wherein said motive means imparts equal and opposite movement to both of said blades.

13. The invention according to claim 9 wherein said motive means comprises a linear actuator.

14. The invention according to claim 13 and further comprising means for translating rotary movement of said actuator to linear movement of said blades.

15. The invention according to claim 8 wherein said peripheries of said first and second openings are of the same size and configuration.

16. The invention according to claim 15 wherein said configuration is polygonal, having at least four sides.

17. The invention according to claim 16 wherein said first portions of each of said first and second cutting edges comprise a first and a second of said sides of each of said peripheries, and said second portions comprise a third and a fourth of said sides.

18. The invention according to claim 8 wherein said first and second cutting edges are substantially surrounded by respective first and second guide surfaces extending outwardly from said cutting edges and angularly away from said common plane.

19. The invention according to claim 18 wherein said first and second guide surfaces each comprise substantially planar surfaces.

20. A blade for use in apparatus for processing an elongated, filamentary member having a central core surrounded by at least one layer of covering material, said processing including cutting through at least a portion of said covering material with a cutting edge of said blade, said blade comprising:
a) a unitary, rigid body member having front and rear, planar, parallel surfaces; and
b) a cutting edge forming at least a portion of a periphery fully surrounding a through opening in said body member, said cutting edge having first and second portions physically spaced about an axis perpendicular to said surfaces, said first and second portions being adapted to cut at least partially through said covering layer of a filamentary member extending along said axis upon relative movement of said body member and said filamentary member in first and second directions, respectively, each of said directions being parallel to said surfaces.

21. The invention according to claim 20 wherein said cutting edge is in the plane of said rear surface.

22. The invention according to claim 21 wherein said cutting edge forms the entire periphery of said opening.

23. The invention according to claim 22 wherein said periphery is polygonal in configuration.

24. The invention according to claim 22 wherein said periphery is formed of four linear sides of equal length.

25. The invention according to claim 21 wherein said opening is substantially surrounded by a guide surface extending from said front surface angularly to said rear surface.

26. The invention according to claim 25 wherein said periphery has a plurality of linear sides and said guide surface comprises a plurality of segments, each of said segments being adjacent a corresponding one of said sides.

27. The invention according to claim 26 wherein each of said segments is substantially planar.

28. Apparatus for processing an elongated, filamentary workpiece as the latter is moved longitudinally along a predetermined axis, said apparatus comprising:
a) first conveyor means including first and second endless belts, said first belt passing tautly about a first and a second roller, said second belt passing tautly around a third and a fourth roller, said first through fourth rollers establishing the paths of travel of said first and second belts to include opposed, linear stretches for engaging opposite sides of said workpiece and transporting it along said axis between first inlet and first outlet ends of said first conveyor means;
b) second conveyor means including third and fourth endless belts, said third belt passing tautly around a fifth and a sixth roller, said fourth belt passing tautly around a seventh and eight roller, said fifth through eighth rollers establishing the paths of travel of said third and fourth belts to include opposed, linear stretches for engaging opposite sides of said workpiece and transporting it along said axis between second inlet and second outlet ends of said second conveyor means;
c) blade means positioned between said first and second conveyor means for operating upon said workpiece;
d) said first outlet end being the portion of said first conveyor means closest to said blade means, and said second inlet end being the portion of said second conveyor means closest to said blade means; wherein
e) said first and third rollers are adjacent said first inlet end, and said second and fourth rollers are adjacent said first outlet end and have diameters less than the diameters of said first and third rollers; and
f) said fifth and seventh rollers are adjacent said second outlet end, and said sixth and eighth rollers are adjacent said second inlet end and have diameters less than the diameters of said fifth and seventh rollers.

29. The invention according to claim 28 wherein said first, third, fifth and seventh rollers are of substantially the same, relatively large diameter, and said second, fourth, sixth and eighth rollers are of substantially the same, relatively small diameter.

30. The invention according to claim 28 and further including guide means defining a passageway coaxial with said axis, said guide means being positioned between said first outlet end and said blade means.

31. The invention according to claim 30 wherein said passageway includes an inlet opening at one end positioned closely adjacent said first outlet end of said first conveyor means, and an outlet opening at the other end closely adjacent said blade means.

32. The invention according to claim 31 wherein said second inlet end of said second conveyor means is positioned closely adjacent said blade means.

33. The invention according to claim 32 wherein said blade means consists of a single pair of superposed blade members having mutually contacting, planar surfaces in a fixed plane perpendicular to said axis.

34. Apparatus for processing an elongated, filamentary workpiece as the latter is moved longitudinally along a predetermined axis, said apparatus comprising:
a) first transport means at inlet side of said apparatus engaging said workpiece and moving it along said axis;
b) second transport means at an outlet end of said apparatus for engaging said workpiece and moving it along said axis;

c) blade means positioned between said first and second transport means for operating upon said workpiece;

d) guide means positioned between said first and second transport means and including a plurality of sections collectively defining a passageway at least a portion of which is of predetermined cross section slightly larger than said workpiece, said passageway extending between first and second ends along a linear central axis, said second end being closely adjacent said blade means and constituting the terminus of a selectively interchangeable one of said plurality of sections;

e) means for mounting said guide means for movement between a first position, wherein said central axis is coincident with said predetermined axis, and a second position, wherein at least said second end is laterally spaced from said predetermined axis; and f) means for moving said guide means between said first and second positions.

35. The invention according to claim 34 wherein said guide means is pivotally moveable about an axis of rotation perpendicular to said central axis.

36. The invention according to claim 35 wherein said axis of rotation intersects said central axis at a predetermined point remote from said second end.

37. The invention according to claim 36 wherein said predetermined point is closely adjacent said first end of said passageway.

38. The invention according to claim 34 wherein said means for moving includes a solenoid.

39. The invention according to claim 38 wherein said guide means is mounted for pivotal movement, said solenoid includes a linearly moveable operating rod, and further including a linkage for translating linear movement of said rod to pivotal movement of said guide means.

40. The invention according to claim 34 wherein said blade means consists of a single pair of superposed blade members having mutually contacting, planar surfaces in a fixed plane perpendicular to said predetermined axis.

41. Apparatus for processing an elongated, filamentary workpiece extending along a fixed, linear axis, said apparatus comprising:
a) first blade means including first and second cutting edges disposed in generally opposed, spaced relation in a common plane perpendicular to said axis;
b) second blade means including third and fourth cutting edges disposed in generally opposed, spaced relation in a plane closely spaced and parallel to said common plane; and
c) means for effecting simultaneous movement of said first and second blade means from a neutral position in each of two, opposite directions parallel to said common plane, said first and third cutting edges being disposed on one side and said second and fourth cutting edges on the other side of said axis in said neutral position, whereby said workpiece is engaged by said first and fourth cutting edges upon movement of said first and second blade means in one of said opposite directions and by said second and third cutting edges upon movement of said first and second blade means in the other of said opposite directions.

42. The apparatus of claim 41 wherein each of said first, second, third and fourth cutting edges is substantially V-shaped and said blade means are supported with the apex of each of said cutting edges directed away from said axis.

43. The apparatus of claim 41 wherein said first and third cutting edges are substantially coextensive and said second and fourth cutting edges are substantially coextensive when said blade means are in said neutral position.

44. The apparatus of claim 41 wherein said blade means are moved by first, substantially equal distances in said one of said opposite directions, and by second, substantially equal distances, greater than said first distances, in said other of said opposite directions.

45. The apparatus of claim 41 and further including means for moving said workpiece longitudinally along said axis while said blade means are in said neutral position.

46. The apparatus of claim 45 wherein said means for moving said workpiece include means for controlling the distance of travel of said workpiece.

47. The apparatus of claim 45 wherein said means for moving said workpiece include means for moving said workpiece in opposite directions along said axis.

48. Apparatus for processing an elongated, filamentary workpiece having a linear, longitudinal axis, said apparatus comprising:
a) first structure defining a first cutting edge;
b) second structure defining a second cutting edge and rigidly connected to said first structure with said first and second edges in spaced, generally opposed relation in a first, common plane;
c) third structure defining a third cutting edge;
d) fourth structure defining a fourth cutting edge and rigidly connected to said third structure with said third and fourth edges in spaced, generally opposed relation in a second, common plane;
e) means for supporting said first, second, third and fourth structures in a first position wherein said first and second planes are in closely spaced, parallel relation, and said first and third edges are on one side and said second and fourth edges are on the opposite side of said axis and each of said edges in spaced relation to said workpiece; and
f) means for simultaneously moving said first and second structures away from said first position in a first direction and said third and fourth structures away from said first position in a second direction, opposite to said first direction, to move said first and fourth edges toward one another into engagement with said workpiece, and for simultaneously moving said first and second structures away from said first position in said second direction and said third and fourth structures away from said first position in said first direction to move said second and third edges toward one another into engagement with said workpiece.

49. The apparatus of claim 48 wherein said first and third edges are substantially coextensive and said second and fourth edges are substantially coextensive when said structures are in said first position.

50. The apparatus of claim 48 wherein said first and second structures form portions of a first, unitary body member, and said third and fourth structures form portions of a second, unitary body member.

51. The apparatus of claim 50 wherein said first and second body members include first and second planar surfaces, respectively, said first and second surfaces being in mutual, sliding contact during movement in said first and second directions.

52. The apparatus of claim 51 wherein said first and second cutting edges form respective portions of the periphery of a through opening in said first body member, and said third and fourth cutting edges form respective portions of the periphery of a through opening in said second body member.

53. The apparatus of claim 52 wherein each of said first, second, third and fourth cutting edges is substantially V-shaped.

54. The apparatus of claim 53 wherein the apex of each of said cutting edges is directed away from said axis when said blade members are in said first position.

* * * * *